United States Patent [19]
Lorie et al.

[11] Patent Number: 5,146,590
[45] Date of Patent: Sep. 8, 1992

[54] METHOD FOR SORTING USING APPROXIMATE KEY DISTRIBUTION IN A DISTRIBUTED SYSTEM

[75] Inventors: Raymond A. Lorie; Honesty C. Young, both of San Jose, Calif.

[73] Assignee: International Business Machines Corporation, Armonk, N.Y.

[21] Appl. No.: 830,796

[22] Filed: Feb. 5, 1992

Related U.S. Application Data

[63] Continuation of Ser. No. 297,169, Jan. 13, 1989, abandoned.

[51] Int. Cl.$^5$ .................. G06F 7/06; G06F 7/08; G06F 7/14; G06F 7/36
[52] U.S. Cl. .................. 395/600; 364/228.2; 364/229; 364/252.3; 364/282.1; 364/283.1; 364/283.4; 364/282.4; 364/282.2; 364/281.3; 364/281.7; 364/256.4; 364/253.1; 364/DIG. 1; 364/DIG. 2
[58] Field of Search .............. 395/600, 800, 375, 325, 395/425, 700, 725, 400; 364/512

[56] References Cited

U.S. PATENT DOCUMENTS

| | | | |
|---|---|---|---|
| 4,604,686 | 8/1986 | Reiter et al. | 395/500 |
| 4,727,509 | 2/1988 | Johnson et al. | 364/900 |
| 4,837,735 | 6/1989 | Allen, Jr. et al. | 364/200 |
| 4,858,146 | 8/1989 | Shebini | 364/512 |
| 5,006,978 | 4/1991 | Neches | 395/650 |

FOREIGN PATENT DOCUMENTS 1385893 3/1975 United Kingdom .

OTHER PUBLICATIONS

Dobosiewicz et al., "Sorting by Distributive Partitioning", Information Processing Letters, vol. 7, No. 1, pp. 1-6, Jan. 1978.

"The Art of Computer Programming", vol. 3, Sorting and Searching, pp. 99-105.

Janus, et al., "An Adaptive Method for Unknown Distributions in Distributive Partitioned Sorting", IEEE Transactions on Computers, vol. C-34, No. 4, pp. 367-372, Apr. 1985.

Teich et al., International Workshop, Database Machings, Munich, West Germany, 1983, pp. 206-226 (Springer-Verlag).

(List continued on next page.)

Primary Examiner—Thomas C. Lee
Assistant Examiner—Daniel H. Pan
Attorney, Agent, or Firm—Baker, Maxham, Jester & Meador

[57] ABSTRACT

A fast method for sorting data in a distributed data processing system is disclosed. Each processor $P_i$ 12$i$ locally sorts its data into a local sorted file $S_i$ 34$i$, simultaneously producing an index to the sorted data and a file of key data records R' 32 each comprising a key value paired with the processor's identifier. Each processor produces a distribution table $DT_i$ 28$i$ of its key values using the index, and sends the table to acoordinator processor 18 which merges the processors' tables into a global distribution table GST 30. The global distribution table assigns subranges of key values to the processors, and is broadcast back to them. Each processor then sends each paired key value and processor identifier to the processor assigned by the global distribution table to handle the subrange containing that key value. The processors receive and merge the incoming key data records simultaneously as they send such pairs to other processors. An output stream $V_i$ 36$i$ consisting only of processor identifiers is created by each processor from the merged key value and processor identifier pairs, and is sent to the host H 16, which merges it into a global output stream of processor identifiers. The processors simultaneously send their local sorted files $S_i$ to the host, which reads records from them in the order specified by the global output stream V.

22 Claims, 7 Drawing Sheets

OTHER PUBLICATIONS

Menon, "A Study of Sort Algorithms for Multiprocessor Database Machines", Proceedings of the Twelfth International Conference on Very Large Data Bases, Kyoto, Aug. 1986, pp. 197–206.

Maekawa, "Parallel sort and join for high speed database machine operations", AFIPS National Compupter Conference, 1981, pp. 515–520.

Yuan-Chieh Chow, "Parallel Sorting in Local Computer Networks", (Int'l Journal of Mini & Microcomputers) vol. 7, No. 3, 1985, pp. 71–74, Anaheim, Calif.

X. Zhou et al., "Multi-selection and Distributed Sorting", (Proceedings of the 2nd Int'l Conf. on Computers and Applications), 23 Jun. 1987, pp. 490–493, Beijing, China.

K. V. S. Ramarao, "Distributed Sorting on Local Area Networks", (IEEE Transactions on Computers), vol. 37, No. 2, Feb. 1988, pp. 239–243, New York, N.Y.

M. Beck et al., "Design and Evaluation of a Parallel Sort Utility", (Proceedings of the 1986 Int'l Conference on Parallel & Distributed Processing), 19 Aug. 1986, pp. 934–941, Pennsylvania.

PHASE 3 DATAFLOW
FIG. 5

PHASE 2 DATAFLOW
FIG. 4

PHASE 4 DATAFLOW
FIG. 6

| | |
|---|---|
| H01 | send request to coordinator task /* received by C01 */ |
| H02 | for each i do /* consider successively each processor and read its V stream */ |
| H03 | while stream $V_i$ not fully consumed do |
| H04 | j = read value from stream $V_i$ /* sent by M13 */ |
| H05 | /* the value in $V_i$ indicates from which stream $S_j$ the next record needs to be read */ |
| H06 | read record from stream $S_j$ /* sent by S33 */ |
| H07 | /* process the record */ |
| H08 | endwhile |
| H09 | endfor |

PSEUDOCODE FOR HOST TASK

FIG. 7

| | |
|---|---|
| C01 | receive request from host task /* sent by H01 */ |
| C02 | send request to all P's /* received by scan task S03 and merge task M02 */ |
| C03 | /* request and wait for all DT's */ |
| C04 | for each i in any order do |
| C05 | receive $DT_i$ /* sent by S11 */ |
| C06 | endfor |
| C07 | compute GDT /* compute the Global DT */ |
| C08 | for each i do /* broadcast to all processors |
| C09 | send GDT to $P_i$ /* received by S12 */ |
| C10 | endfor |

PSEUDOCODE FOR COORDINATOR TASK

FIG. 8

```
S01    /* there are actually N such tasks active, one on each
       P_i */
S02    /* the process produces keys to be sent to the merge
       tasks and records to the host task */
S03    receive request from coordinator task /* sent by C01 */
S04    While not end-of-file on F_i do
S05         read record from F_i
S06         /* normally there could be a predicate to be
            checked here */
S07         send record to sort package
S08    endwhile
S09    call sort /* to sort the record and build an index to
       indicate the lowest key on each page of S_i */
S10    extract the DT from the index /* DT contains a local
       random sample */
S11    send DT to coordinator /* received by C05 */
S12    receive GDT from coordinator /* sent by C09 */
S13    /* start sending keys for the merge phase */
S14    for each ri do
S15         /* prepare N cursors, one for each subrange */
S16         find entry in index
S17         initialize the scan to the first record with key
            in range ri
S18    endfor
S19    activeCursor = N; /* the number of non exhausted
       subrange cursors */
S20    while (activeCursor > 0) do
S21         for each ri do /* loop through all subranges in a
            round-robin fashion */
S22              for k blocks of a subrange in S_i /* send k
                 blocks from a subrange in a batch */
S23                   if subrange cursor is exhausted then
S24                        decrement activeCursor by 1
S25                        break /* continue the next
                           while iteration */
S26                   else
S27                        prepare and send R' to P_i /*
                           received by M04 or M10 */
S28                        advance to next record
S29              endfor
S30         endfor
S31    endwhile
S32    while not end-of-file on S_i do /* send the sorted file
       to the host */
S33         send a record to host /* received by H04 */
S34    endwhile
```

PSEUDOCODE FOR SCAN TASK

FIG. 9

```
M01     /* there is a merge task on each P_i */
M02     receive the request from the coordinator task
M03     for each P_i do
M04             initialize reading a stream from P_i
M05             read the first R' from P_i /* sent by S27 */
M06     endfor
M07     repeat
M08             k = processor identifier where the minimum key is
                from
M09             add k to V_i
M10             read next R' from P_k /* sent by S27 */
M11     until all R's are processed
M12     while V_i not exhausted do /* send V_i to the host */
M13             send V_i to host /* received by H04 */
M14     endwhile
```

PSEUDOCODE FOR MERGE TASK

FIG. 10

METHOD FOR SORTING USING APPROXIMATE KEY DISTRIBUTION IN A DISTRIBUTED SYSTEM

This is a continuation of application Ser. No. 07/297,169 filed Jan. 13, 1989, now abandoned.

BACKGROUND OF THE INVENTION

1. Technical Field

This invention relates to distributed data processing systems, and more particularly to methods for sorting data distributed across multiple processors in such a system.

2. Description of the Prior Art

A database management system is a computer system for recording and maintaining data. A relational database management system stores data as rows in tables, and refers to a collection of tables as a database. Users or application programs manipulate (select, update, insert, or delete) the data by issuing requests or commands (called queries) against the database. In a relational database management system's data query and manipulation language, such as SQL, queries are nonprocedural (also referred to as nonnavigational). That is, users or application programs simply specify what is wanted, rather than specifying a procedure for accomplishing it.

Most relational database systems make heavy use of sorting as a technique for satisfying complex queries. Since the user communicates with the system only via the query language, the system can choose any internal data storage mechanism it wishes. In particular it can partition the data, which is why this invention finds its most important applications in the relational system arena.

In most cases today, records to be sorted are stored in a single file on a single system, but this is changing. In order to increase the amount of data that can be read per second, a technique that is gaining popularity and will become more and more important, is to distribute data among several subfiles. These subfiles can then be stored on different disks, and different processors can read and process them in parallel. This technique of distributing data plays an increasingly important role in relational database management systems.

As a background to the discussion which follows, we define certain key terms and concepts. A "stream" is a sequence or records or values that is the output of a producer task, and the input of a consumer task, as follows:

producer—stream→ consumer

Behind the notion of the stream, there is a mechanism of "blocking". The producer produces several records or values, assembles them into a blocks of data. For example, 500 records of 80 bytes might be blocked into ten 4000 byte pages. Each block is sent to the consumer task as soon as it is produced. When the consumer needs to read a record or a value from the stream, it takes the next record from the block. If the block has been fully consumed it is discarded and the next block is used if it has already been received. If the next block has not yet been received the consumer task waits until the next block is received from the producer. This blocking mechanism is used for both intra-processor communication such as disk I/O (in which data is transferred between a disk and a processor), and intra-processor communication in which data is transferred between processors. We will therefore refer to "reading from a stream", "receiving from a stream", "writing to a stream", and "sending to a stream"—it being understood that a blocking mechanism is used to create the stream.

Another key concept is that of a "single site sort", in which a single file is sorted by its is a single, attached processor. In brief, a single site sort is performed as follows. First, records are read from the file, producing a stream of records which accumulate in a preallocated area in memory. When that area is full the records that it contains are sorted and written, in order, to a working area. This process of reading, sorting and writing is repeated until the whole file has been processed, resulting in several sorted working areas on disk. These steps all together constitute the "sort phase".

After the sort phase, the records are read (as streams) from the working areas. The first record from each of the working areas is compared with other like records to find the smallest one (the one with the smallest, or first, sort key value). That record is then written to the output stream S and consumed from the working area to which it is belonged, leaving the next record from that working area as the first in that area's stream. These steps of comparison, writing and reading are repeated until all of the working areas are emptied, at which time the output stream has received the entire sorted file. This process is termed the "merge phase". For sake of simplicity, it may be assumed that all working areas can be handled in a single merge phase, as frequently occurs in practice.

To provide insight into sorting performance, we use a very simplified but meaningful example. Assume a processor with a speed of 5 million instructions per second (5 MIPS). Assume we want to sort 1 million (1M) records of 80 bytes each. Plausible performance (in seconds) are given in Table 1 for each step of the sort and merge phases. The column CPU reflects the time needed by the central processing unit (CPU) to execute the instructions. The column I/O reflects the time needed to read or write blocks of data from or to the disk. Current processing techniques allow these operations to overlap, so that the total elapsed time is the maximum of the CPU and I/O.

TABLE 1

| Response Time of Single Site Sort | | | |
|---|---|---|---|
| | CPU | I/O | Elapsed |
| read file: | 20 | 200 | 200 |
| sort: | 200 | | 200 |
| write file: | 20 | 200 | 200 |
| read file: | 20 | 200 | 200 |
| merge file: | 200 | | 200 |
| return file: | 100 | | 100 |
| total: | | | 1100 seconds |

The problem of achieving acceptable response time when sorting in distributed systems has been known for some time, and several attempts to provide solutions have been made in the prior art. It is illuminating to compare three such prior art methods. In the following discussion, will use the base values underlying the example of Table 1 (5 MIPS processors, and 1M records of 80 bytes each). We will assume that the distributed system comprises 100 processors, each storing 10,000 records on attached dedicated disks. Because we are concerned with reducing the response time for the sort operation, we do not consider the fact that idle processors could be working on other operations unrelated to the sort.

The singles of the prior art methods consists of sending all records to a single one of the processors, and letting it do the sort. This method may be termed the "central sort and merge" method. For the sake of simplicity we will ignore the time needed to send the data over the communication network, by assuming that the communication hardware/software is efficient enough to not be a limiting factor. The response time for the steps of this method are shown in Table 2.

TABLE 2

Response Time of Central Sort and Merge

|  | CPU | I/O | Elapsed |
|---|---|---|---|
| at each site: |  |  |  |
| read file: | 0.2 | 2 | 2 |
| central sort and merge, at the sort site: |  |  |  |
| sort: | 200 |  | 200 |
| write file: | 20 | 200 | 200 |
| read file: | 20 | 200 | 200 |
| merge file: | 200 |  | 200 |
| return file: | 100 |  | 100 |
| total: |  |  | 902 seconds |

The total response time for the central sort and merge method is thus 902 sec. Almost nothing is done in parallel.

A second prior art method consists of sorting in each processor those records in its respective subfile, then sending the sorted subfiles to a single processor for merging. This method thus consists of a distributed sort phase, and a central merge phase. The response times for this method are given in Table 3.

TABLE 3

Response Time of Distributed Sort, Central Merge

|  | CPU | I/O | Elapsed |
|---|---|---|---|
| distributed sort, at each site: |  |  |  |
| read file: | 0.2 | 2 | 2 |
| sort: | 2 |  | 2 |
| write file: | 0.2 | 2 | 2 |
| read file: | 0.2 | 2 | 2 |
| merge file: | 2 |  | 2 |
| central merge, at the merge site: |  |  |  |
| merge file | 200 |  | 200 |
| return file: | 100 |  | 100 |
| total: |  |  | 310 seconds |

The total response time for the distributed sort, central merge method is thus 310 sec. Again, a large portion of the work (the merge phase) is not done in parallel.

The third prior art method may be termed a "distributed sort and merge, serial return" sort. In this method, a partition of the overall key range is computed by some technique into subranges such that a roughly equal number of records falls in each subrange. Any well-known distributed random sampling technique may be used. Each subrange ri is assigned to one of the distributed processors processor in a one-to-one fashion. Each processor sends each of its records to that processor assigned to handle the subrange in which the record falls. When all records have been sent to the appropriate processor, each processors has all of the records in its assigned subrange (in fact only copies or the records are sent, since the original records stay where they were stored originally). Each processor then sorts and merges the records that it has, and sends its sorted records to the host. This return of the sorted records is done serially, with the processor assigned the lowest subrange going first, then the next lowest, and so on. The response time of the "distributed sort and merge, serial return" method is shown in Table 4.

TABLE 4

Response Time of Distributed Sort and Merge, Serial Return

|  | CPU | I/O | Elapsed |
|---|---|---|---|
| distributed sort and merge, at each site: |  |  |  |
| read file: | 0.2 | 2 | 2 |
| sort: | 2 |  | 2 |
| write file: | 0.2 | 2 | 2 |
| read file: | 0.2 | 2 | 2 |
| merge file: | 2 |  | 2 |
| write file: | 0.2 | 2 | 2 |
| return subfiles serially from each site: |  |  |  |
| return file: | 100 | 200 | 200 |
| total: |  |  | 212 seconds |

Even with this method too much work is done in a nonparallel manner, and the 100 processors are far from being used efficiently, each processor being idle for 198 of the last 200 seconds. The problems are as follows. First, the return of the results to the host is serialized, meaning that the second processor cannot begin until the first finishes. This is responsible for most of the elapsed time for the method. Second, the entire records must be sent once before sorting, and once after sorting. In both cases, the load on the communication network is 160M bytes (2× number of records (1M)× record length (80 bytes) ). Although this communications load is not considered in the response times above, the consequences of such two full transmissions of the actual data significantly affects the performance of the "distributed sort and merge, serial return" method.

As distributed database management system become widespread, and maximum acceptable response times drop, the need for a fast method for sorting in a distributed database management system grows increasingly urgent. The present invention addresses that need.

SUMMARY OF THE INVENTION

This invention comprises a method for sorting data in a distributed system. The system has at least two processors, each of which stores data to be sorted. Communications means such as a network provides means for communicating between the processors. The first step of the method sorts each processor's data by key value, and determines the distribution of key values at each processor. The next step determines a global key value distribution of at least two subranges based on the processors' distributions. Next, each subrange is assigned to a target processor. Each processor communicates its identifier and its key values in sorted order to the values' respective assigned target processors. The target processors create sort sequence data representing a merger of the key values received from the processors, preferably simultaneously with the processors' communication of identifiers and key values. Finally, each processor's sorted data is received by a user according to the order represented by the sort sequence data.

The invention avoids the drawbacks associated with the prior art methods, particularly the "distributed sort and merge, serial return" method discussed above. First, the sending of keys, the merge, and the return of rows to the host, are all done in parallel. The only serialized portion is the sending of a set of processor id's to the host, and there the amount of information is extremely small (one or two bytes per record). Thus the serialized portion of work in this invention is extremely small, and does not significantly increase the method's total response time. The second problem with the prior art which this invention avoids is that of communications load. Of course, in all distributed systems the full records must ultimately be sent to the host, resulting in a minimum communications load equal to the number of records multiplied by the record length. However each of the prior art methods discussed above also requires sending the full records a second time. In this invention the full records are sent to the host from their original locations, without transit through another processor. This invention further reduces the communications load by minimizing the amount of data transmitted between the processors. Communication from any one of the processors to the host is a rather easy problem (one can even use independent wires), and inherently produces minimal communications load. Sending data between the processors (N-to-N communication) produces a greater load per amount sent by requiring the use of a hardware network or switch, which is much more time consuming. The amount of data sent between the processors by this invention is equal to the number of records multiplied by the key length. The reduction in communications load thus depends on the ratio between the record length and the key length, which in practice is often 10:1 or more.

Other features and advantages of this invention will become apparent from the following detailed description of the presently preferred embodiment of the invention, taken in conjunction with the accompanying drawings.

BRIEF DESCRIPTION OF THE DRAWINGS

FIG. 9 shows a pseudocode implementation of the scan task of this invention.

DETAILED OF THE PREFERRED EMBODIMENT

Figure 1:
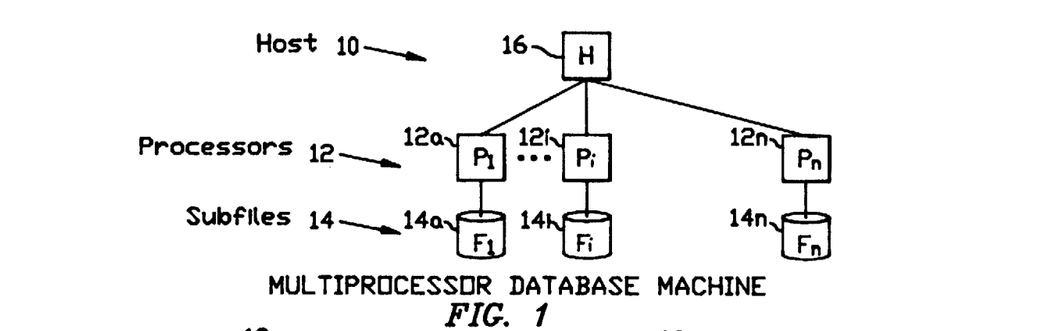
FIG. 1 is a generalized overview of a multiprocessor database machine in which this invention is used.

The preferred embodiment of the method of this invention rapidly and efficiently sorts a file which is partitioned across multiple distributed processors in a distributed relational database management system. An example of such a system 10 is shown in FIG. 1, in which several distributed processors $P_1$ 12a, $P_2$ 12b ... $P_n$ 12a, communicate via message passing on a communication network 13. A file F consisting of subfiles $F_1$ 14a, $F_2$ 14b ... $F_n$ 14n, is distributed across the processors, with each subfile $F_i$ 14 being stored on processor $P_i$ 12. A host processor H 16 is connected to all processors $P_i$ 12. Sorting the file F on behalf of the host H 16 requires the processors $P_i$ 12 to produce a sorted file $S_i$ 34 and return it to the host.

Figure 2:
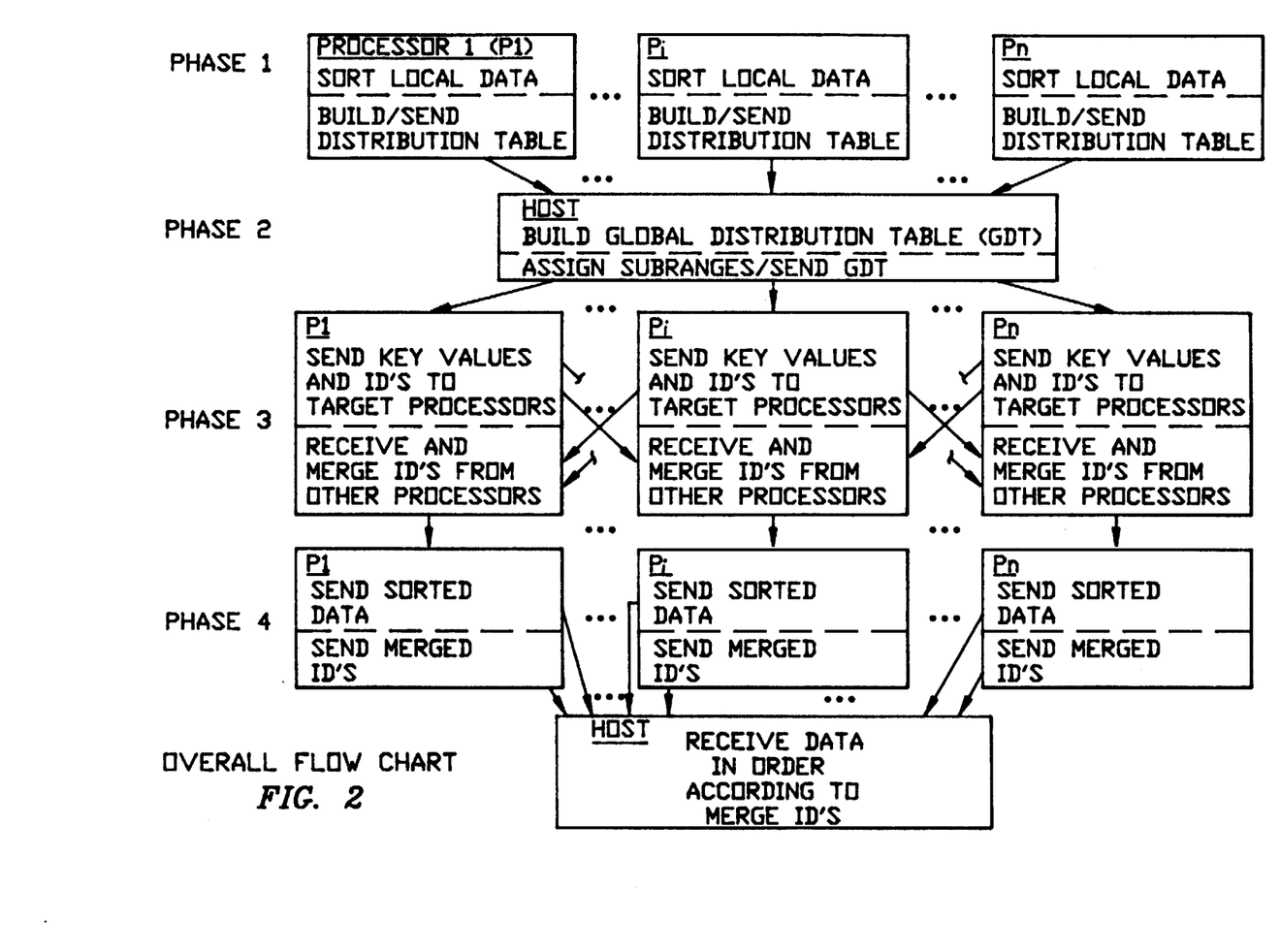
FIG. 2 shows an overall flowchart of the phases of FIGS. 3-6.

This method can be divided into four phases, shown together in overview in FIG. 2 and separately in FIGS. 3-6, respectively. Phase 1 effectively comprises multiple local sorts. Phase 2 assigns key subranges to the processors $P_i$ 12. In phase 3 the record keys are distributed to their assigned processors, and simultaneously the assigned processors receive and merge the incoming keys. Phase 4 sends sort sequence data and the distributed, sorted records to the host 16.

Four basic tasks are involved in the sort, each task being a program or other process running on a processor (including the host 16). The "host task" 20 is always executed on the host machine H 16. The "coordinator task" 22 executes on a coordinator processor 18, which may be any one of the distributed processors $P_i$ 12 or the host H 16. The "scan task" 24 and "merge task" 26 are each run on each of the distributed processors $P_i$ 12 participating in the sort. While a few messages are sent from one task to another, individually, the bulk of data is transferred by streams.

The host task 20 running on the host H 16 sends the initial sort request to the coordinator 22, thereby beginning phase 1 of the process. It then waits until phase 4, when the host H 16 starts receiving a stream $V_i$ 36 from one of the processors $P_i$ 12i. At that time, the host task 20 considers successively each value in $V_i$ 36. A value i indicates that the next record for the final sorted output S should be read from the stream of records coming from the i-th processor $P_i$ 12i.

The coordinator task 22 running on the coordinator processor 18 waits for the initial sort request from the host task 20. When it receives the request for a sort, it sends the request to all the processors $P_i$ 12i, triggering phase 1 of the sort. It then waits until phase 2, when all the processors send their distribution tables $DT_i$ 28i to the coordinator 18. Based on these distribution tables $DT_i$ 28i the coordinator constructs the global distribution table GDT 30, which assigns subranges of the key values to the processors. The coordinator task 22 sends the global distribution table GDT 30 to all the processors, and terminates, ending phase 2.

The scan task 24 runs on each processor $P_i$ 12i during phases 1, 3 and 4 of the sort. During phase 1 it performs a local sort of the processor's data. In phase 3 it prepares and sends key data 32 for the processors's records to the processors assigned to process the appropriate subranges. When all the key data has been sent, and phase 4 begins, the scan task 24 starts sending the full records to the host.

The merge task 26 runs on each processor $P_i$ 12i during phases 3 and 4 of the sort. While the scan task is sending data during phase 3, the merge task 26 is concurrently receiving the key data 32 from the processors' scan tasks 24 (including its own), and merging it to produce the sort sequence data $V_i$, which consists of a series of processor identifiers. When all such data has been received and merged and phase 3 is over, the merge task begins phase 4. In phase 4 the merge task 26 sends its sort sequence data $V_i$ to the host task 20, which uses that data to read full records in served order from the streams or sorted local files $S_i$ being simultaneously sent by the scan tasks 24 in phase 4.

Phase 1

Figure 3:
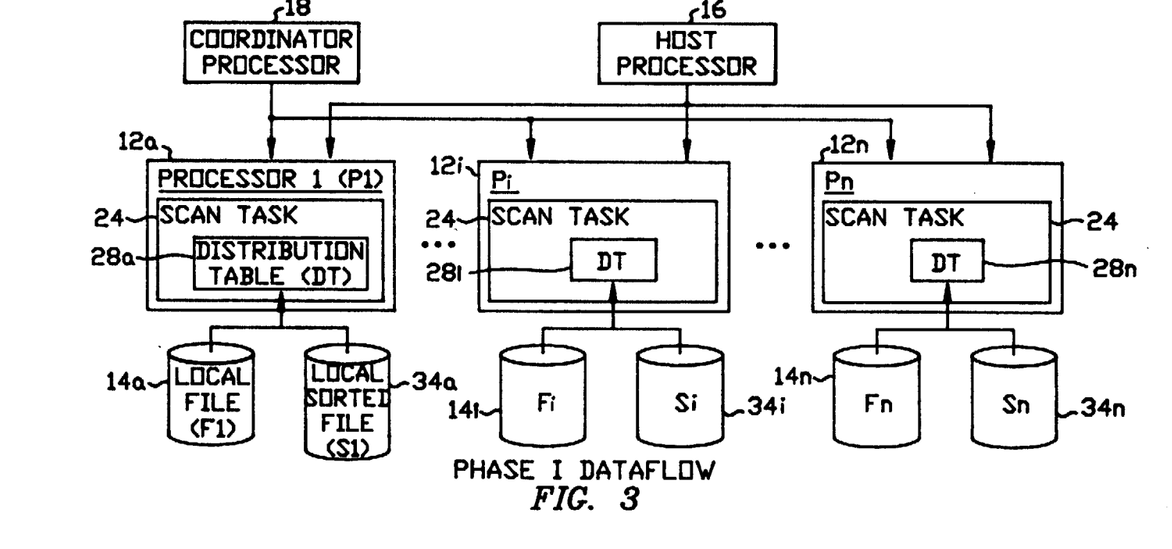
FIG. 3 schematically shows the phase 1 dataflow of the preferred embodiment of this invention.

Phase 1 of the sort, shown in FIG. 3, is performed by a first portion of the scan task 24, running on each of the processors $P_i$ 12i. Phase 1 can start on any processor as soon as it receives its sort request from the coordinator task 22. The processor scans its local file $F_i$ 14i, applies any specified predicates if such selection is involved, and sorts the matching records. This local sort may be done using any method, including the single site method described above in the section entitled "Description of the Prior Art". The result of the local sort is a local sorted file $S_i$ 34 of sorted records each containing a key value and a record body.

While the scan task 24 is locally sorting the data records during phase 1, it is also building two working files. The first is a local index that facilitates direct access to a particular key value in the sorted local file $S_i$ 34. An index on a sorted file is a data structure that contains the lowest key stored in a single block of the local sorted file. The local index is used to start reading the local sorted file at the first record which has a key greater or equal to a given value, since the index can be used to find the first block which has a lowest key value smaller than the given value.

The second object built by the scan task 24 in phase 1 is the processor's distribution table $DT_i$ 28i, which contains information on the key distribution for use by the coordinator task 22 during phase 2. The distribution table $DT_i$ 28i is built using the data in the local index.

Phase 2

Figures 4, 5:
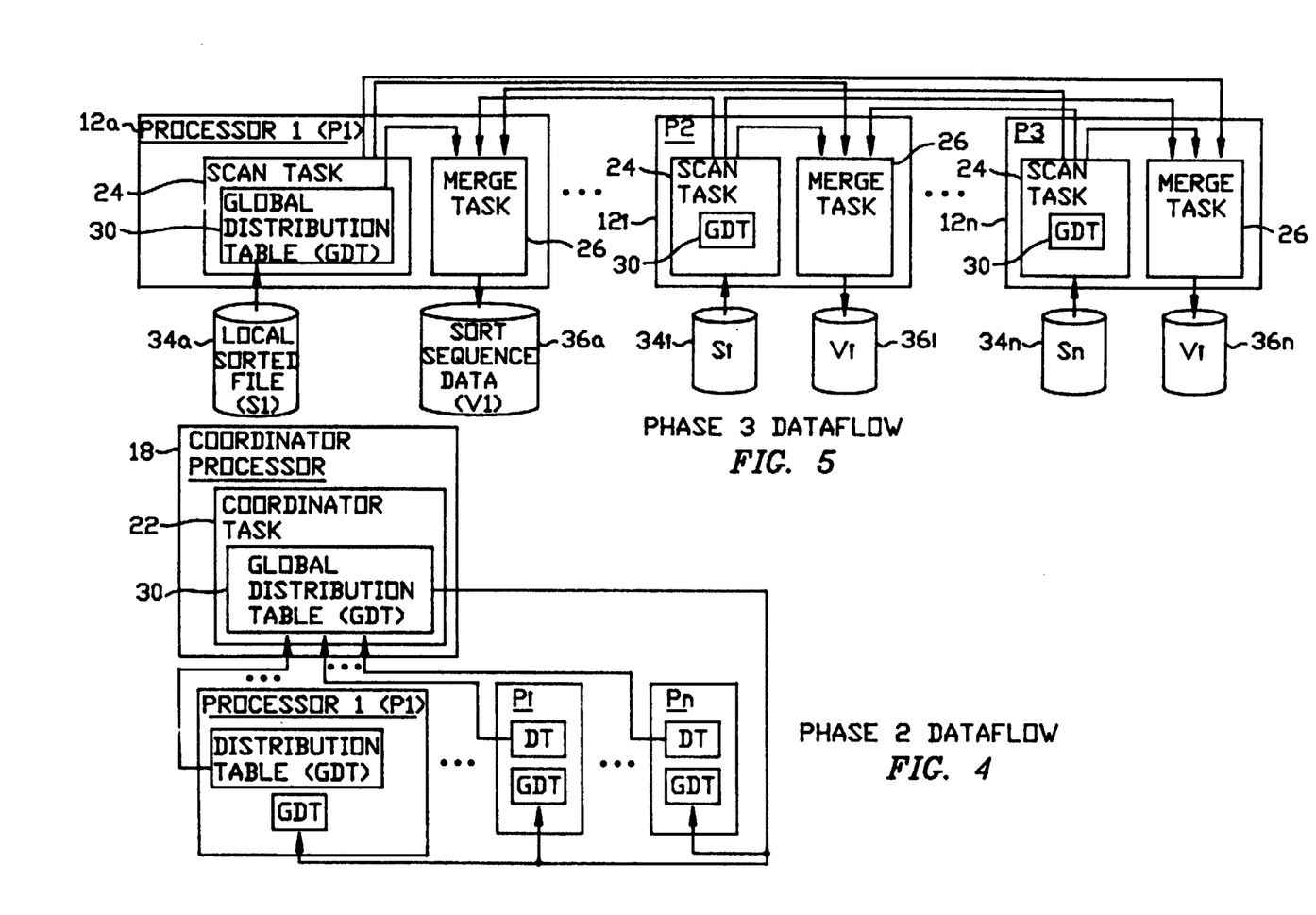
FIG. 4 schematically shows the phase 2 dataflow of this invention.
FIG. 5 schematically shows the phase 3 dataflow of this invention.

As soon as a processor $P_i$ 12i has completed phase 1, it sends its distribution table $DT_i$ 28i to the coordinator task 22 at the coordinator processor 16. This begins phase 2 of the sort, which is shown in FIG. 4. When the coordinator task 22 has received the distribution tables $DT_i$ 28i from all the processors, it merges them and combines their contents to produce the global distribution table GDT 30. The global distribution table GDT 30 contains the boundaries of a number of subranges, such that the numbers of records with keys falling in each range are roughly (statistically) equal. The number of subranges is preferably equal to the number of processors $P_i$ 12, i.e. equal to 'n'. The subranges are assigned to processors on a one-on-one basis. The coordinator task 22 then sends the global distribution table GDT 30 to all the processors $P_i$ 12, which have been waiting to receive it.

Phase 3

Phase 3, shown in FIG. 5, starts for each processor $P_i$ 12i when it receives the global distribution table GDT 30 from the coordinator 18. Upon receiving this table the processor's scan task 24 starts to read sequentially the records from its local sorted file $S_i$ 34 (a stream). For each record in that file it builds a key data record R' containing two fields. The first field in the key data record R' 32 is the key of the record. The second is the processor identifier.

Each key data record R' 32 is sent to a target processor which is chosen as follows. The key value in key data record is compared to the subrange boundaries in the global distribution table GDT 30, and the subrange into which the key value falls is identified. The processor assigned to that subrange by the coordinator task 22 (and communicated as such in the global distribution table GDT 30) is identified, and that processor becomes the target processor for that key data record R. The key data record R' 32 is then sent to the target processor (in a stream), and is received by that processor's merge task 26.

Thus on each processor $P_i$ 12i there are two concurrent tasks executing during phase 3: the scan task which produces records, and the merge task which consumes records received from the scan tasks. These tasks run concurrently, one executing when the other is waiting on communication or I/O.

The local sorted files $S_i$ 34i are not processed purely sequentially by the scan tasks 24 during phase 3, because this would overload certain of the merge tasks 26.

Consider the data flow if such sequential processing were used. All processors would start sending key value records that fall in the first subrange, and all communication would be being sent to the lone processor assigned to the first subrange, overloading its merge task 26. Then when records in the second subrange are sent, another processor would be overloaded, etc.

The solution to this problem consists of processing only a small portion (say, a single block) of the records in the first subrange. While the target processor for that subrange suspends its scan task 24 and handles the corresponding merge, all of the remaining scan tasks 24 on the other processors skip to the beginning of the second subrange using the local index discussed above, and send a small portion to that subrange's target processor. The scan tasks 24 then move on to the third subrange, and so on. After a portion of the the last subrange has been sent, the producing scan tasks 24 begin again with the first subrange, and so on, in a round-robin fashion. Over a sufficiently large period of time, all processors are kept busy, sending, receiving, and merging records. Of course, key data records R' are still processed sequentially within the same subrange, since that is a necessary condition for the merge.

The merge task 26 of a given processor $P_i$ 12i receives only records having keys falling into that processor's assigned subrange, and all such records received from a single processor come in sorted order. These ordered streams of keys can then be merged as explained earlier, resulting in a single output stream $V_i$ 36i. This output stream $V_i$ need contain only the source processor identifier extracted from the R'—the key value may be omitted for reasons explained below with respect to phase 4.

Phase 4

Figure 6:
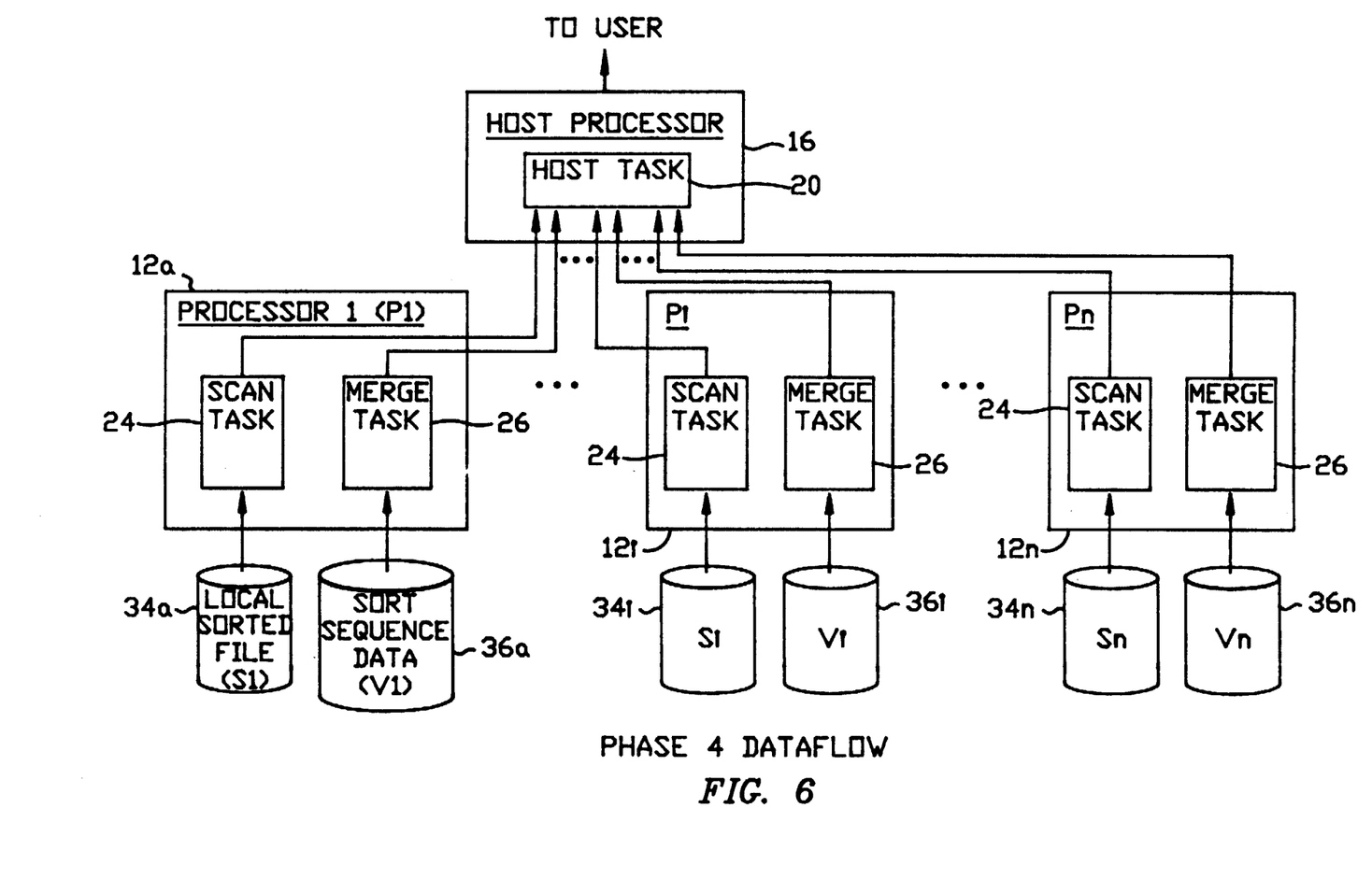
FIG. 6 schematically shows the phase 4 dataflow of this invention.

In phase 4, shown in FIG. 6, the merge task 26 at each processor $P_i$ 12i sends its output stream $V_i$ 36i to the host task 20 at the host processor 16. At the same time, the processors' scan tasks 24 send their local sorted files $S_i$ 34i to the host task 20, also as streams.

To read the full records in sorted order the host task 20 looks at the output stream $V_i$ 36i of each of the processors, in the order in which the processors were assigned to subranges, beginning with the processor of the lowest subrange. By reading the next entry in the output stream $V_i$ (which consists of only a processor identifier k), the host task 20 knows to get the next full record from the stream of records coming from the scan task 22 of that processor $P_k$.

PSEUDOCODE IMPLEMENTATIONS OF THE TASKS

The Host Task 20

FIGS. 7-10 show pseudocode implementations of the host, coordinator, scan, and merge tasks. It should be remembered that, as explained above, a read operation will wait for a stream if a block has not been received, and that a blocking mechanism exists for the stream implementation.

Figure 7:
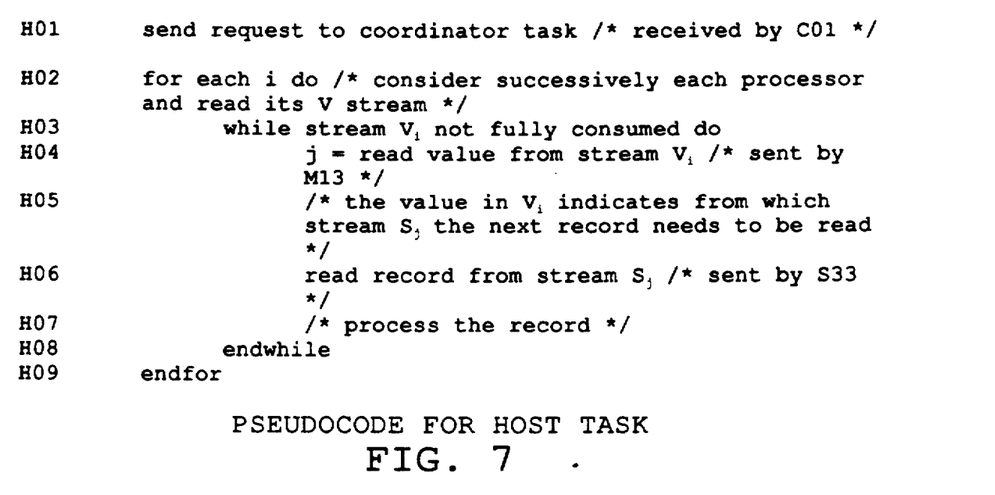
FIG. 7 shows a pseudocode implementation of the host task of this invention.

FIG. 7 details the host task 20. In line H01 the request is sent to the coordinator 18. From that point on, the host is not involved until it starts receiving the first output stream $V_1$ in phase 4. In fact, the host task 20 executes lines H02 and H03, but then automatically waits until stream $V_1$ starts arriving.

As each output stream $V_i$ 36i arrives, line H04 is executed to find from which processor the next full record needs to be fetched. Since records arrive as parts of streams coming from each processor, line H06 gets the record from the processor. If the needed page on the stream from the processor, then the record can be processed by line H07. This means that the record is sent on to the host user's program which requested the sort. Otherwise line H06 will wait until the next block of records arrives from the appropriate processor.

The host task 20 continues reading from the output stream $V_i$ 36i and the designated full record streams $S_i$ until the output stream is exhausted (controlled by line H08), and then turns to the next output stream in order (controlled by line H09). When all output streams have been processed the sort is complete.

The Coordinator Task 22

Figure 8:
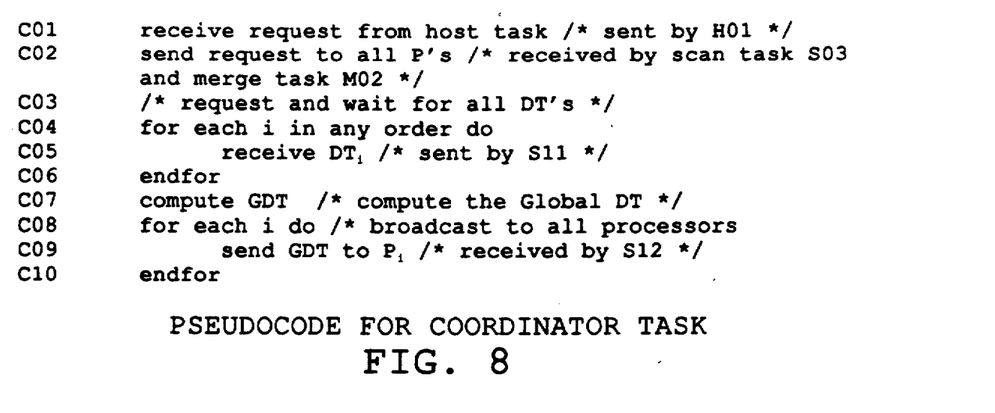
FIG. 8 shows a pseudocode implementation of the coordinator task of this invention.

FIG. 8 shows a pseudocode implementation of the coordinator task 22. Line C01 receives the request from the host 16, and determines the processors to which the requests needs to be passed. Lines C04-C06 comprise a loop to read all the local distribution tables $DT_i$ 28i from the all processors $P_i$ 12. These tables are received on a first come, first received fashion, i.e. in random order. When all DT's have been received, line C07 merges them and computes the global distribution table GDT 30. Lines C08-C10 are a loop that sends the global distribution table GDT 30 to all the processors $P_i$ 12. Once this is done, the coordinator task 22 terminates.

The Scan Task 24

FIG. 9 shows a pseudocode implementation of the scan task 24. The scan task's activity in phase 1 is performed by lines S03-S09; in phase 2 by lines S10-S12; in phase 3 by S13-S31; and in phase 4 by lines S32-S34.

The program fragment at lines S04-S09 does the initial sort of Phase 1, which produces the local sorted file $S_i$ 34i, the local index, and the key data records R'. The loop between lines S04-S08 reads each record, applies any predicate which may have been specified for record selection, and (if the record matches the predicate), submits the record to the sort component. In reality the instructions in the loop of lines S04-S08 are intertwined with the execution of the sort, but they are shown separately in FIG. 9 for the sake of illustration. The sort routine of line S09 receives the records from the loop S04-S08, and sorts them as described above.

Phase 2 activity begins at line S10, when sample values for the processor's distribution table DT 28 are extracted from the local index and sent to the coordinator 18 (line S11). The scan task 24 then waits until it receives the global distribution table GDT 30 at the end of phase 3.

Phase 3 activity for the scan task 24 begins with the loop of lines S14-S18, which is repeated for each processor in charge of a subrange $r_i$ of key values. Each stored local file $S_i$ will have zero or more keys to be sent to each processor. The local index is used to determine where the records for these groups of keys are located in the local sorted file $S_i$. A cursor (a mobile position indicator) is positioned at the beginning of each group of keys of a subrange (line S17).

The round-robin sending of key data records R'32 to their assigned processors $P_i$ 12 is done by the triple loop of lines S20-S31. The outer loop is over the number of nonexhausted cursors; the middle over the subranges $r_i$; and the inner over a number k of blocks in each subrange. The triple loop executes until the key data of all records in all the submerges have been sent to their assigned target processors' merge tasks in blocks. As described above, not all records in a subrange processed at once. Instead, a certain number of block of records in a subrange are processed, then a certain number from the next subrange etc., in a round-robin manner to avoid overloading any one merge task 26.

Finally, during phase 4, the loop of lines S32-S34 sends the full records R of the local sorted file $S_i$ 34i to the host 16.

The Merge Task 26

Figure 10:
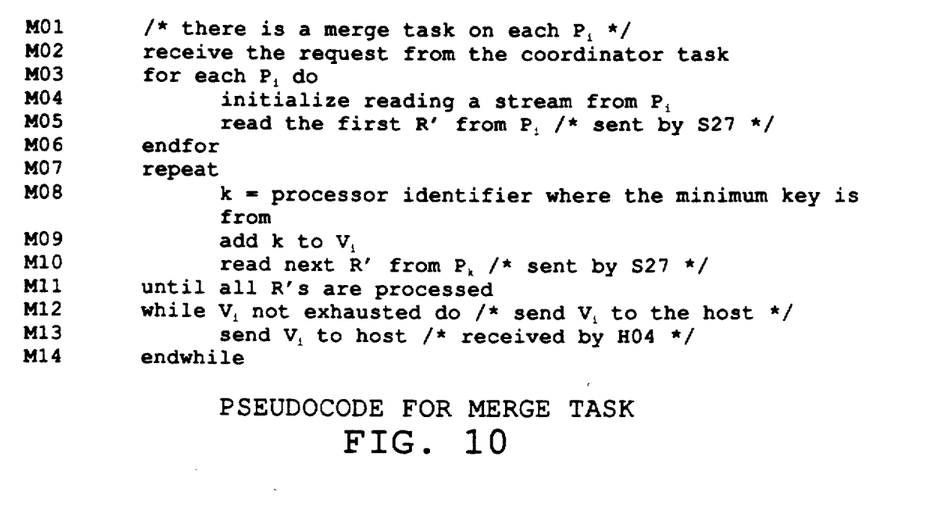
FIG. 10 shows a pseudocode implementation of the merge task of this invention.

FIG. 10 shows a pseudocode implementation of the merge task 26, which is active during phases 3 and 4 of the sort. In M02, the merge request is received from the coordinator task, and the merge task 26 initializes itself (line M04) to read streams of key data records R' 32 from each of the processors.

Lines M03-M11 are active during phase 3. The loop of lines M03-M06 identifies the lowest value in the key data being received from the scan tasks 24 of the processors. The loop of lines M07-M11 successively adds the processor identifier k of the current lowest key value to the output stream $V_i$ 36i, and reads the next key data record R' 32 from the incoming stream from the processor just added to the output stream. Any known method to find the minimum key among a set of keys may be used in line M08. Again for simplicity, if an incoming stream of key data records R' 32 is exhausted it is not considered further. As blocks of the output stream are filled they are written to the disk. The loop of lines M07-M11 is repeated until all the incoming streams of key data records R' are exhausted, and phase 3 is ended.

In phase 4 the loop at lines M12-M14 sends the output stream $V_i$ 36i of sort sequence data 32 (consisting of processor identifiers only) to the host task 20. When this is completed, the sort process is finished on the processor.

EXAMPLE

The operation of this invention's sort method may be better appreciated by considering an illustrative example. Suppose that a distributed file is to be sorted on the single layer (field 1). The file is distributed across three processors $P_1$, $P_2$, $P_3$, as shown in Table 5.

TABLE 5

| Distributed Data to be Sorted | | |
|---|---|---|
| $P_1$ | $P_2$ | $P_3$ |
| W Walter | P Peggy | T Tom |

TABLE 5-continued

| Distributed Data to be Sorted | | |
|---|---|---|
| $P_1$ | $P_2$ | $P_3$ |
| B Brian | H Henry | D Dan |
| G Greg | F Frank | K Kathy |
| C Christine | G Gloria | A Adam |
| T Teresa | M Mary | E Eric |
| B Barbara | F Frances | P Peter |
| S Steve | L Linda | R Ruth |
| N Norman | N Nancy | L Larry |
| H Helen | C Carl | W Wendy |
| M Mark | D Debbie | J John |
| A Alice | S Sue | J Jane |
| M Mary | R Ron | E Elizabeth |

Because all of the processors have data which is part of the file, the coordinator task 22 (line C02) sends the sort request to all of the processors.

The results of the processor's phase 1 local sorts are shown in Table 6.

TABLE 6

| Phase 1 - Local Sorted Files $S_i$ 34i | | |
|---|---|---|
| $P_1$ | $P_2$ | $P_3$ |
| A Alice | C Carl | A Adam |
| B Barbara | D Debbie | D Dan |
| B Brian | F Frances | E Elizabeth |
| C Christine | F Frank | E Eric |
| G Greg | G Gloria | J Jane |
| H Helen | H Henry | J John |
| M Mark | K Kevin | K Kathy |
| M Mary | L Linda | L Larry |
| N Norman | N Nancy | P Peter |
| S Steve | P Peggy | R Ruth |
| T Teresa | R Ron | T Tom |
| W Walter | S Sue | W Wendy |

Assuming that each page of the local sorted files $S_i$ 34i contains two full records, the local indexes are as shown in Table 7.

TABLE 7

| Phase 1 - Local Indexes | | |
|---|---|---|
| $P_1$ | $P_2$ | $P_3$ |
| A | C | A |
| B | F | E |
| G | G | J |
| M | K | K |
| N | N | P |
| T | R | T |

Because three processors will participate in the distributed sort, the sort request communicated by the coordinator task 22 specifies that each distribution table $DT_i$ 28i should contain three entries, dividing the local index into three local subranges. The distribution tables DT 28 produced by the processors are shown in Table 8.

TABLE 8

| Phase 2 - Distribution Tables DT 28 | | |
|---|---|---|
| $P_1$ | $P_2$ | $P_3$ |
| B | F | E |
| M | K | K |
| T | R | T |

In phase 2, the coordinator receives the above distribution tables DT 28 and merges them, producing the key samples:

BEF KKM RTT

The global distribution table GDT 30 is computed from these samples. Since the largest key may not be in the sample, the last range needs to specify an upper limit of "infinity". The subranges are assigned to the three processors (as target processors) so that processor $P_1$ is responsible for subrange 1, i.e. for key values through "F". Processor $P_2$ is responsible for values through "M", and processor 3 for values through infinity. The resulting global distribution table GDT 30 is shown in Table 9.

TABLE 9

| Phase 2 - Global Distribution Table GDT 30 | | |
|---|---|---|
| Subrange | Key values | Processor |
| 1 | to F | $P_1$ |
| 2 | to M | $P_2$ |
| 3 | to infinity | $P_3$ |

In phase 3, the processors' scan tasks 24 send key data records to the merge tasks 26 of the processors as indicated by the global distribution table GDT 30. Normally each processor $P_i$ 12i would read one page of its sorted file $S_i$ 34i in each round. The production (communication) of key data records R' 32 by the scan tasks 24 is shown in Table 10. For simplicity, the R' record sent by processor $P_i$ to processor $P_j$ is denoted as $<key,i> \rightarrow P_j$.

TABLE 10

| Phase 3 - Key Data Records R' 32 Produced by Scan Tasks 24 | | | |
|---|---|---|---|
| | $P_1$ | $P_2$ | $P_3$ |
| round 1: | $<A,1> \rightarrow P_1$ | $<C,2> \rightarrow P_1$ | $<A,3> \rightarrow P_1$ |
| | $<B,1> \rightarrow P_1$ | $<D,2> \rightarrow P_1$ | $<D,3> \rightarrow P_1$ |
| round 2: | $<G,1> \rightarrow P_2$ | $<G,2> \rightarrow P_2$ | $<J,3> \rightarrow P_2$ |
| | $<H,1> \rightarrow P_2$ | $<H,2> \rightarrow P_2$ | $<J,3> \rightarrow P_2$ |
| round 3: | $<N,1> \rightarrow P_3$ | $<N,2> \rightarrow P_3$ | $<P,3> \rightarrow P_3$ |
| | $<S,1> \rightarrow P_3$ | $<P,2> \rightarrow P_3$ | $<R,3> \rightarrow P_3$ |
| round 4: | $<B,1> \rightarrow P_1$ | $<F,2> \rightarrow P_1$ | $<E,3> \rightarrow P_1$ |
| | $<C,1> \rightarrow P_1$ | $<F,2> \rightarrow P_1$ | $<E,3> \rightarrow P_1$ |
| round 5: | $<M,1> \rightarrow P_2$ | $<K,2> \rightarrow P_2$ | $<K,3> \rightarrow P_2$ |
| | $<M,1> \rightarrow P_2$ | $<L,2> \rightarrow P_2$ | $<L,3> \rightarrow P_2$ |
| round 6: | $<T,1> \rightarrow P_3$ | $<R,2> \rightarrow P_3$ | $<T,3> \rightarrow P_3$ |
| | $<W,1> \rightarrow P_3$ | $<S,2> \rightarrow P_3$ | $<W,3> \rightarrow P_3$ |

Simultaneously during phase 3, each processor's merge task 26 receives key data records R' from the scan tasks 24 as shown in Table 11. The term EOS at round 7 stands for "end of stream".

TABLE 11

| Phase 3 - Key Data Records R' 32 Received by Merge Tasks 26 | | | |
|---|---|---|---|
| | $P_1$ | $P_2$ | $P_3$ |
| round 1: | $<A,1>,<B,1>,$ $<C,2>,<D,2>,$ $<A,3>,<D,3>$ | | |
| round 2: | | $<G,1>,<H,1>,$ $<G,2>,<H,2>,$ $<J,3>,<J,3>$ | |
| round 3: | | | $<N,1>,<S,1>,$ $<N,2>,<P,2>,$ $<P,3>,<R,3>$ |
| round 4: | $<B,1>,<C,1>,$ $<F,2>,<F,2>,$ $<E,3>,<E,3>$ | | |
| round 5: | | $<M,1>,<M,1>,$ $<K,2>,<L,2>,$ $<K,3>,<L,3>$ | |
| round 6: | | | $<T,1>,<W,1>,$ $<R,2>,<S,2>,$ $<T,3>,<W,3>$ |
| round 7: | EOS | EOS | EOS |

The merge tasks 26 on each processor merge their respective incoming streams of the key data records R'

32, producing the output streams $V_i$ 36i of processor identifiers. Table 12 contains the (intermediate) results of those merges, and the output streams $V_i$ 36i of the processors.

TABLE 12

Phase 3 - Merged Key Data Records and Output Streams $V_i$ 36i

|  | $P_1$ | $P_2$ | $P_3$ |
|---|---|---|---|
| Key Data | <A,1> | <G,1> | <N,1> |
| Records R': | <A,3> | <G,2> | <N,2> |
|  | <B,1> | <H,1> | <P,2> |
|  | <B,1> | <H,2> | <P,3> |
|  | <C,1> | <J,3> | <R,2> |
|  | <C,2> | <J,3> | <R,3> |
|  | <D,2> | <K,2> | <S,1> |
|  | <D,3> | <K,3> | <S,2> |
|  | <E,3> | <L,2> | <T,1> |
|  | <E,3> | <L,3> | <T,3> |
|  | <F,2> | <M,1> | <W,1> |
|  | <F,2> | <M,1> | <W,3> |
| Output streams $V_i$: | 131112233322 |  |  |
|  |  | 121233232311 |  |
|  |  |  | 122323121313 |

In phase 4 the host task 20 receives the local output streams $V_i$ 36i of sort sequence data and concatenates them to produce a global output stream V. The global stream V specifies the sequence in which records should be read from the incoming sorted local files $S_i$ 32i (see Table 6) to produce a global sorted stream S of full records, which is the final result of the sort.

The global output stream V and global sorted stream S are shown in Table 13. Note that the output stream V specifies first taking a record from processor $P_1$'s local sorted file $S_1$, then a record from $P_3$'s file $S_3$, then three records from $S_1$, two from $S_2$, three from $S_3$, two from $S_2$, one from $S_1$, one from $S_2$, one from $S_1$ again, another from $S_2$, two from $S_3$, and so on. The final sorted output is not in true alphabetic order since the sort was keyed on only the first letter of the name.

TABLE 13

Phase 4 - Final Sorted Data S

Global output stream V:
131112233322121233232311122323121313

Global sorted output S:

| Record | From | Record | From | Record | From |
|---|---|---|---|---|---|
| A Alice | $S_1$ | G Greg | $S_1$ | N Norman | $S_1$ |
| A Adam | $S_3$ | G Gloria | $S_2$ | N Nancy | $S_2$ |
| B Barbara | $S_1$ | H Helen | $S_1$ | P Peggy | $S_2$ |
| B Brian | $S_1$ | H Henry | $S_2$ | P Peter | $S_3$ |
| C Christine | $S_1$ | J Jane | $S_3$ | R Ron | $S_2$ |
| C Carl | $S_2$ | J John | $S_3$ | R Ruth | $S_3$ |
| D Debbie | $S_2$ | K Kevin | $S_2$ | S Steve | $S_1$ |
| D Dan | $S_3$ | K Kathy | $S_3$ | S Sue | $S_2$ |
| E Elizabeth | $S_3$ | L Linda | $S_2$ | T Teresa | $S_1$ |
| E Eric | $S_3$ | L Larry | $S_3$ | T Tom | $S_3$ |
| F Frances | $S_2$ | M Mark | $S_1$ | W Walter | $S_1$ |
| F Frank | $S_2$ | M Mary | $S_1$ | W Wendy | $S_3$ |

RESPONSE TIME (PERFORMANCE)

The response time of this invention's distributed sort method is vastly improved over even the best of the prior art methods. For the same example discussed above in the section entitled "Description of the Prior Art" (100 5 MIPS processors, and 1M records of 80 bytes each), the response time of the preferred embodiment is shown in Table 14.

TABLE 14

Response Time of The Preferred Embodiment

|  | CPU | I/O | Elapsed |
|---|---|---|---|
| Phase 1:read file $F_i$ | 0.2 | 2 | 2 |
| sort: |  | 2 | 2 |
| write file $S_i$ | 0.2 | 2 | 2 |
| Phase 3:read file $S_i$ | 0.2 | 2 | 2 |
| Phase 4:read file $S_i$ | 0.2 | 2 | 2 |
| total: |  |  | 10 |

The first "field file", the "sort", and the "write file" are all part of the phase 1 local sort by the scan task 24. The second "read file", of the local sorted file $S_i$ 34i, is done by the scan task 24 (line S27) when preparing and sending the key data records R' to the merge tasks 26 during phase 3. The third "read file" is done by the scan task 24 (line S33) when sending the full records of the local sorted file $S_i$ 34i to the host in phase 4.

The importance of reducing the amount of communication becomes apparent from inspecting these results. Ideally, the communication load should not slow down the execution of the sort. During the second "read file", data must be transmitted in an N-to-N manner among the processors. The data to be transmitted is equal to the number of records multiplied by the key length in bytes. Assuming 1M 100-byte records and a key length of 10 bytes, the N-to-N communication aggregate bandwidth for this invention's method must be 5 MB/sec in order to finish the communication in 2 seconds. If instead the full record had to be transmitted, as in the prior art methods, an aggregate bandwidth of 50 MB/sec would be required in order to complete the same communication in 2 seconds. This invention thus substantially reduces the aggregate bandwidth required for N-to-N communication, but transmitting only the key data records R' instead of the full records.

It will be appreciated that, although specific embodiments of the invention have been described herein for purposes of illustration, various modifications may be made without departing from the spirit and scope of the invention. In particular, in the preferred embodiment the entire file of data records is read twice—once to send the keys to the merge tasks, and again to return the records to the host. Since only the key field is used to create the key data records R', it may be preferable to have the phase 1 sort write two local files: $S_i$ with the entire records and $K_i$ with keys only. In phase 3, $K_i$ would then be read instead of $S_i$.

The number of scan tasks 24 involved in the sort is determined by the number of processors storing the data to be sorted. However the number of merge tasks 26 may be chosen independently of the number of scan tasks 24, provided that the number of key subranges is equal to the number of merge tasks. It may thus be possible for a processor 12 to have only a scan task 24, or only a merge task 26. And where the file F to be sorted is not distributed on all processors, it is even possible that a given processor will not participate in the sort at all.

It will be understood, too, that any distributed sampling technique may be used to calculate the individual distribution tables DT 28 and the global distribution table GDT 30.

Finally, because all of the key data records R' in a block have the same source processor identifier (since the block originates from a single processor), it is possible to remove the processor identifier from the key data records R', and place it instead as a leading or trailing part of the block, reducing the N-to-N communication load still further.

Thus, the scope of protection of this invention is limited only by the following claims.

I claim:

1. In a digital computer, the digital computer being programmable for executing a series of steps, a method executable on the computer for sorting data in a distributed system having at least two processors each storing data, means in each processor for sorting data in response to key values included in the data, and communications means for communicating between the processors, the method comprising the steps of:
   (a) sorting stored data for each processor by key values included in the data and producing a key value distribution denoting a distribution of key values for sorted, stored data;
   (b) merging key value distributions from the processors into a global key value distribution, the global key value distribution including at least two subranges, each subrange of the at least two subranges including a plurality of key values, each plurality of key values denoting an amount of data;
   (c) assigning each subrange to a target processor;
   (d) for each processor, communicating to a respective assigned target processor means for identifying the processor and key values, the key values being key values which are in a sub-range assigned to the target processor and which denote stored data stored at the processor;
   (e) for each target processor, creating sort sequence data representing a sorted merger of key values received from the processors; and
   (f) receiving by a user each processor's sorted data according to the order specified by the sort sequence data.

2. A method according to claim 1, wherein step (a) creates a local sorted file; and
   wherein step (f) sends the local sorted files to the user.

3. A method according to claim 1, wherein a key value distribution for each processor is created during step (a).

4. A method according to claim 1, wherein the global distribution is created by a coordinator processor by merging the processors' key value distributions.

5. A method according to claim 4, wherein the coordinator processor is one of the processors.

6. A method according to claim 1, wherein step (d) communicates key data records, each key data record consisting of a key value and an identifier unique to the processor.

7. A method according to claim 1, wherein the sort sequence data consists of only processor identifiers.

8. A method according to claim 1, wherein steps (d) and (e) are performed concurrently.

9. In a digital computer, programmable for executing a series of steps, a method executable on the digital computer for sorting data in a distributed data processing system having at least two processors, storage means attached to each processor for storing data, means in each processor for sorting data in response to key values included in the data, communications means for communicating between each of the processors, and regulator means for requesting sorting of the processors' data, the method comprising the steps of:
   (a) communicating a sort request from the requestor means to the processors;
   (b) for each processor, sorting data stored in the processor's storage means into local sorted files, and determining a distribution of key values of that data;
   (c) producing a global key value distribution from key value distributions determined for the processors, the global key value distribution including a range of key values, the range of key values being divided into at least two subranges;
   (d) assigning each subrange of key values to target ones of the processor;
   (e) for each processor, communicating that processor's key values to their respective assigned target processors, together with means for identifying the sending processor;
   (f) for each target processor, merging the key values received from the processors to produce a sorted subrange of the range of key values, such that data taken from the processors' local sorted files in the order specified by the representations of the sorted subrange are in sorted order;
   (g) for each target processor, communicating at least a representation of the sorted subrange of the requestor; and
   (h) processing by the requestor records received from the processors local sorted files in the order specified by the representations of the sorted subrange of key values.

10. A method according to claim 9, wherein the distribution of key values for each processor comprises a local distribution table of key values.

11. A method according to claim 10, wherein step (b) comprises for each processor the steps of:
    (b1) sorting the data by key value to produce a local sorted file,
    (b2) producing a local index of the key values of the local sorted file, and
    (b3) producing the processor's key value distribution using the local index.

12. A method according to claim 9, wherein the distribution of key values for each processor comprises a distribution table of key values, and wherein the global key value distribution comprises a global distribution table of key values.

13. A method according to claim 12, wherein step (c) produces the global distribution table by merging the processors' distribution tables.

14. A method according to claim 13, wherein step (c) comprises the steps of:
    (c1) selecting a coordinator processor;
    (c2) communicating the local key value distributions from the processors to the coordinator; and
    (c3) merging the processors' distribution tables to produce the global distribution table.

15. A method according to claim 14, wherein the coordinator processor is one of the processors.

16. A method according to claim 9, wherein step (d) comprises broadcasting the global key value distribution to the processors over the communication means.

17. A method according to claim 9, wherein step (e) comprises for each processor the step of communicating key data records each consisting of a key value and the local processor's identifier to the target processors according to the assigning of the global distribution.

18. A method according to claim 17, wherein the key data records are produced during step (b).

19. A method according to claim 17, wherein the representations of the sorted subrange method during step (f) consist of only a series of the processors' identifiers.

20. A method according to claim 9, wherein steps (e) and (f) are performed concurrently.

21. A method according to claim 9 wherein step (g) includes communicating the local sorted files to the requestor.

22. A method according to claim 21, wherein the processors' local sorted files are communicated concurrently to the requestor.

* * * * *

UNITED STATES PATENT AND TRADEMARK OFFICE
CERTIFICATE OF CORRECTION

PATENT NO. : 5,146,590

DATED : September 8, 1992

INVENTOR(S) : Lorie et al

It is certified that error appears in the above-identified patent and that said Letters Patent is hereby corrected as shown below:

Col. 15, line 65, change "regulator" to --requestor--.

Signed and Sealed this

Seventh Day of September, 1993

Attest:

BRUCE LEHMAN

Attesting Officer

Commissioner of Patents and Trademarks